Dec. 11, 1945.  H. ZIEBOLZ  2,390,569
APPARATUS FOR DETECTING TRENDS IN OBSERVED DATA
Filed March 24, 1942  3 Sheets-Sheet 1

Inventor
Herbert Ziebolz
By A. D. Adams
Attorney

Dec. 11, 1945. H. ZIEBOLZ 2,390,569
APPARATUS FOR DETECTING TRENDS IN OBSERVED DATA
Filed March 24, 1942 3 Sheets-Sheet 3
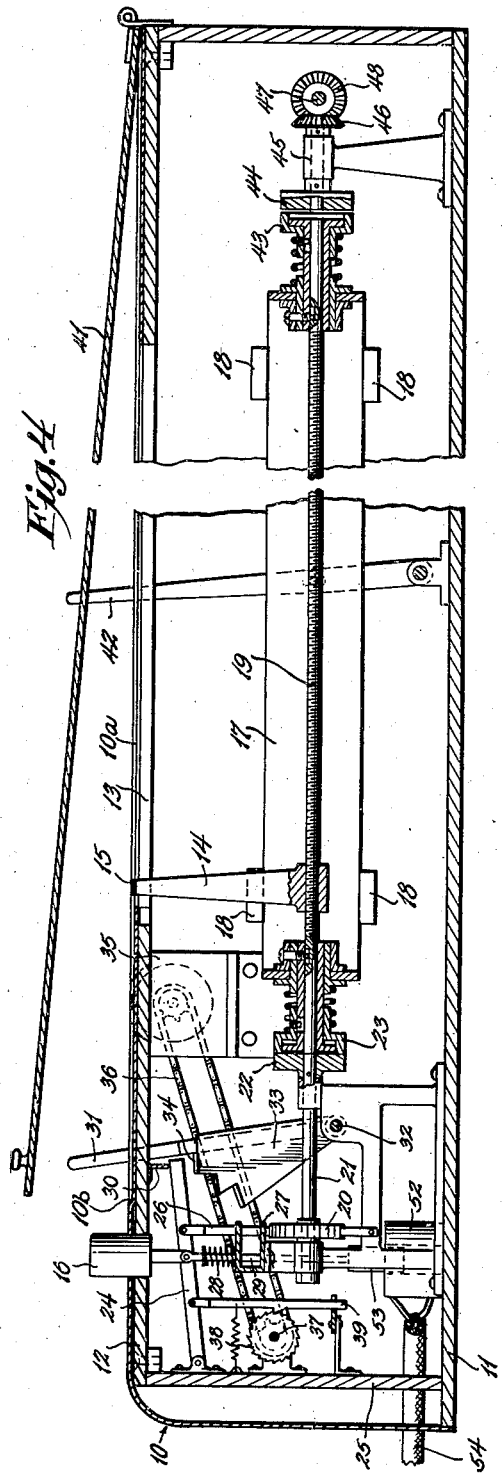
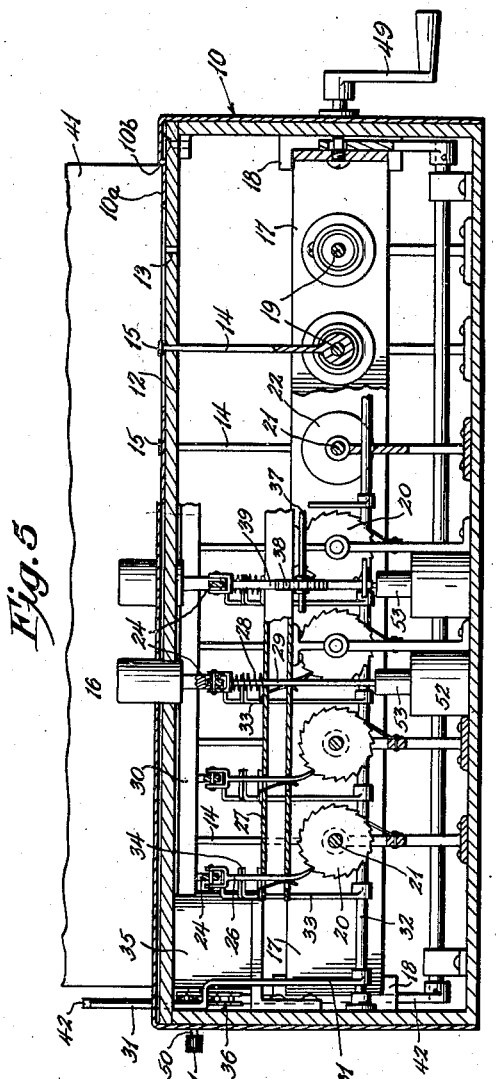
Inventor
Herbert Ziebolz
By A. D. Adams
Attorney Patented Dec. 11, 1945

2,390,569

UNITED STATES PATENT OFFICE 2,390,569

APPARATUS FOR DETECTING TRENDS IN OBSERVED DATA

Herbert Ziebolz, Chicago, Ill., assignor to Askania Regulator Company, Chicago, Ill., a corporation of Illinois Application March 24, 1942, Serial No. 436,020

13 Claims. (Cl. 116—135)

This invention relates generally to an apparatus employable in carrying out an improved method of detecting a trend in observed data and has as a general object to provide a new and improved apparatus of the character described.

It is known that if some variable characteristic of a plurality of like natural objects, such as the height or weight of men or women, the size or weight of eggs or rain drops, and so forth, is subdivided into a plurality of equal ranges of a measure of that characteristic and ranged along the abscissa axis of a graph, and the number of objects, whose observed characteristic falls within each range, are plotted as ordinates on that graph, there results a typical distribution, for example, the so-called normal or probability curve. I have discovered that manufactured or processed articles or products, when similarly observed and the data plotted, produce a generally similar curve. A line drawn through the apex or maximum value of such a normal curve and parallel with the ordinate axis indicates the true average of the objects or specimens observed and the curve shows the distribution of the specimens to one side or the other of the true average value.

The extremities of such a normal curve theoretically continue to infinity and thus are approximately parallel with the abscissa axis. The extremities also lie very close to the abscissa axis because the relative number of specimens that fall within the ranges remote from the true average are few. Since the normal curve is characterized by a rather steep-sided midportion and rapidly flattening extremities, even the number of specimens falling in ranges comparatively close to the true average are few. It follows, therefore, that variation in the number of specimens falling in the more remote ranges would be comparatively minor, and such variations would be difficult of detection by change in the graph at the flattened portions representing these ranges. If thus in a manufacturing operation the finished products are periodically sampled and tested only for the extreme over or under sizes, for example, the possibility of detecting any deviation from desired or given specifications would be remote and very retarded.

I have found, however, that for a very small change in the ordinate value of a normal curve at or near its flattened portion there is a very large change in the ordinate value of a point near the true average value, and that, likewise, there is a large lateral shift of the true average value or of the line drawn through the apex of the curve and parallel with the ordinate axis. It is a feature and object of this invention to utilize the above fact in observing or predicting trends in observed data and especially in manufacturing operations, and to provide a new method of prediction and control based on this fact.

Thus if, in a manufacturing process, a first plurality of samples of the product are taken, checked as to the particular characteristic, and the data plotted, as above mentioned, and subsequently another plurality of samples of the product are taken, checked as to the particular characteristic, and plotted to the same scale as the first plurality of samples, and the ordinate values of the two graphs for a common point selected near the true average value of the first graph are compared, or if the true average lines of the two graphs are compared, there will be easily observed even a slight change in the characteristic of the objects. These observed ordinate values or positions of the true average line will indicate a trend long before such trend could be detected or observed by observation of the outsized products only. This method will, therefore, permit not only the prediction of the number of rejects, but will forecast such increase in the number of rejects and permit correction or adjustment of the manufacturing process in due time to check the trend.

The tabulating and graphing of the data, when the method is applied to a manufacturing or processing operation, might prohibit employment of the method unless some means could be provided whereby the graphs could be produced quickly and accurately, and by individuals other than highly skilled and trained statisticians. It is a further object of this invention, therefore, to perfect a graphing apparatus particularly designed for mechanically producing graphs of the character described.

A further object of the invention is to provide a relatively simple and inexpensive apparatus of the character described.

Other objects and advantages will become apparent from the following detailed description taken in connection with the accompanying drawings, in which:

Fig. 4 is a section taken on the line 4—4 of Fig. 3; and

Fig. 5 is a sectional view taken on the line 5—5 of Fig. 3.

Figure 2:
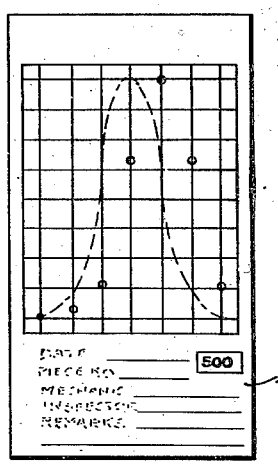
Fig. 2 is a view of a graph sheet on which the data is adapted to be printed or reproduced.
Figure 1:
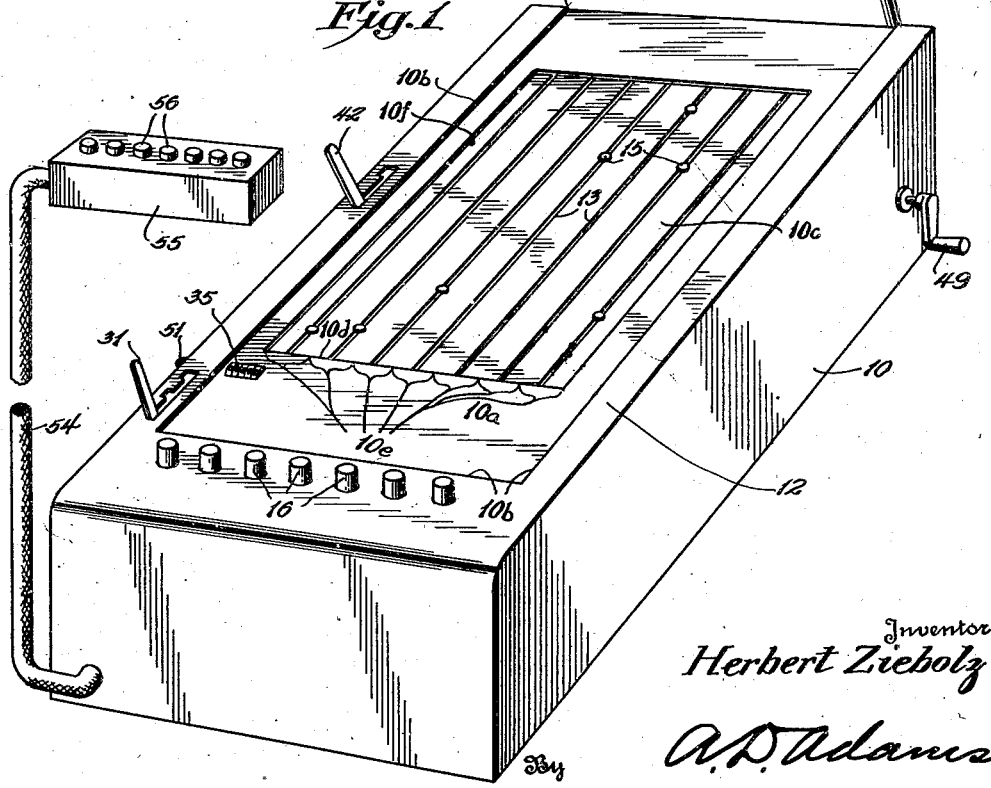
Fig. 1 is a perspective view of a manually operable machine embodying the invention.
Figure 3:
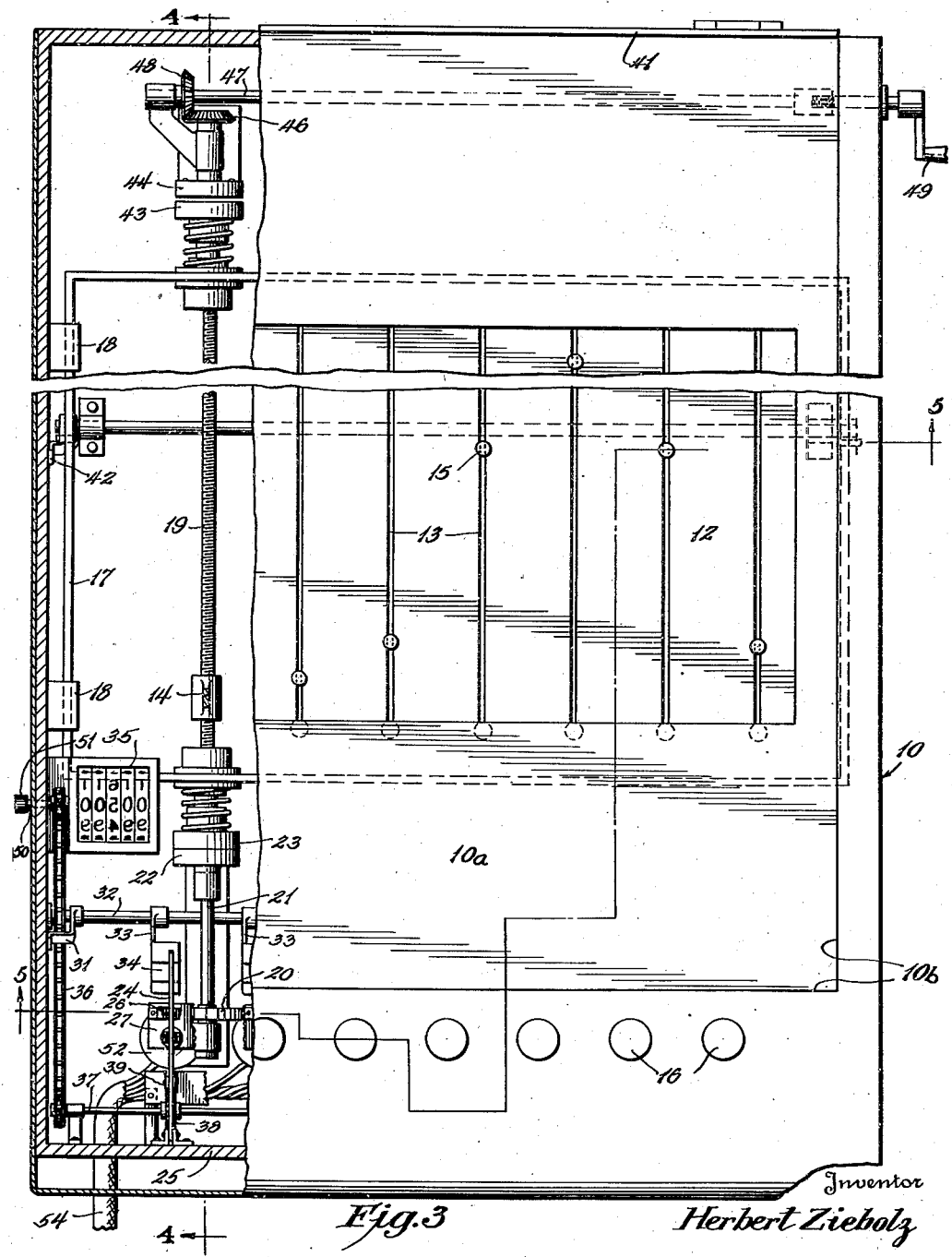
Fig. 3 is a top plan view of the machine, parts being broken away.

Referring particularly to the drawings, the machine, there shown, is designed to be operated manually and is incorporated in a box-like metal casing or housing 10 having a base 11. A top plate 12 of the casing has a rectangular sub-depressed portion 10c, the lower marginal edge 10d of which is subdivided into a plurality of equal divisions 10e representing ranges of some measure of a characteristic, dimension, or the like. This marginal edge 10d may be considered as the abscissa axis of a coordinate axis graph, the ordinate axis being represented by the side marginal edge 10f. Since only the relative rather than the absolute ordinate values are here desired, the marginal edge 10f need not be graduated. Formed in the plate 12 are a plurality of parallel, equally spaced slots 13 parallel with the marginal edge 10d and each located at the midpoint of one of the ranges or divisions 10e. The sub-depressed portion 10c may thus be considered as presenting a chart face with the slots 13 forming predetermined abscissa values.

Housed within the casing and projecting through and movable longitudinally in each slot 13 is an indicating finger 14 having an exposed head 15. The heads 15 are centered with respect to the slots 13 in order that they may represent the same properly spaced abscissa values represented by the slots 13. These fingers are adapted to be actuated by individual push buttons 16 at the front end of the machine. Therefore, after determining the ranges into which the variable or characteristic to be charted is to be subdivided, the ranges are assigned in consecutive order to the divisions 10e, the ranges being similarly assigned to the push buttons 16 inasmuch as there is one push button for each finger 14. Each actuation of a push button advances the associated indicating finger a definite amount, all of the indicators being adapted to move through like distances for each operation of a push button, and all indicators having a common ordinate scale. The idea is to operate the indicators so that the position of each represents the number of units of data, that is, items with a specific characteristic, falling into each range. The total number of actuations of the buttons will represent the total number of objects or specimens in the group and variations can be determined by the positions of the indicating fingers.

In this instance, the mechanism for operating the fingers is carried by a rectangular frame 17 mounted for longitudinal movement in guides 18 at the opposite sides of the casing and comprises a series of screw threaded shafts 19 which operate to advance the fingers when the respective buttons are actuated. Each of the shafts is adapted to be rotated a predetermined amount by means of ratchet wheels 20 mounted on separate operating shafts 21, shown as having clutch disks 22 coacting with spring urged clutch members 23 on the front ends of the screw shafts 19 projecting through the front end of the frame member 17.

The push buttons 16 are shown as being connected to operate pivoted levers 24 mounted on a supporting plate 25 within the casing and these levers carry pivotally connected operating pawls 26 guided for vertical movement in a perforated channel member 27 extending across the casing. The buttons are normally held in the position shown by small compression springs 28 mounted on pivoted links or guide rods 29, also extending through openings in the transverse channel 27.

The free ends of the levers 24 engage a stop member 30 in the form of an angle fixed to the top plate 12. The stroke of all of the levers is controlled by means of an adjustment lever 31 secured to a shaft 32 extending across the casing and carrying stepped plates or wing members 33, one for each of the levers 24. They are shown as having laterally bent ears 34 forming the stop members to limit the downward movement of the levers 24. The arrangement is such that the levers may be adjusted to have strokes of three different lengths to advance the fingers 14 a greater or less distance as desired, depending upon the number of the articles or data to be investigated. In Fig. 4, the adjusting member is set to permit the push buttons to have their minimum stroke so that the ratchet wheels 20 are turned the distance of only one tooth or notch at a time.

In this example, the machine is shown as embodying a totalizer or counter 35, preferably having raised and reversed figures extending slightly above the chart face of the plate 12 to permit figures to be printed or reproduced on a sheet, as will later be described. The counter is shown as being operated by a chain drive 36 connected to a sprocket on the shaft 37 which carries ratchet wheels 38, one for each push button, adapted to be turned by depending detents 39 pivotally connected to the respective levers 24 and operative to turn the shaft upon the return of the push buttons to their normal position or after each push button has been actuated. The arrangement is such that each ratchet wheel 38 is advanced the distance of one tooth, regardless of the adjusted stroke of the levers 24. Also, the counter will be advanced one unit each time any one of the push buttons is operated.

After all of the data desired to be investigated has been tabulated to produce a curve for comparison with a normal or previous sample curve similarly produced, the indicating heads 15 may be observed on the chart face. Also, a permanent record of the curve outline, produced by the relative positions of the indicating fingers in their respective slots, may be made for record or comparison purposes by placing a graph paper or other sheet 40, face downward, on the machine with a sheet of carbon paper between it and the chart face, and an imprint may be made by clamping pressure applied to the back of the sheet 40. This is preferably done by a hinged cover plate 41 adapted to be swung down over the back of the entire graph sheet. In order to align the sheet 40 properly to be imprinted, the top of the housing 10 has a depressed portion 10a providing front and side raised edges 10b against which the bottom and side edges of the sheet abut. The heads 15, as well as the figures on the counter 35, extend slightly above the top surface of the depression 10a as shown so that their impression may be readily transferred to the sheet 40 when the cover 41, which fits within the edges 10b, is pressed against the back of the sheet. It is also contemplated that a glass or other transparent plate (not shown) of such size as to fit in the depression 10a and having a standard curve drawn on it, may be placed in the depression so that the curve produced by the heads 15 may be compared with it. Moreover, the cover 41 may be made of glass or other transparent material and have a standard curve drawn on it for the same purpose. In either event, the glass should also carry the ordinate and abscissae similar to those shown on the sheet 40.

When the desired data has been tabulated for one group of articles or the like, it is necessary to reset the fingers 14 to their zero positions so that the machine may be used again. For that purpose, the longitudinally movable frame 17 carrying the screw shafts and their clutch elements is adapted to be shifted rearwardly by a pivoted clutch lever 42 so that the spring pressed clutch elements 23 on the screw shafts will be disengaged from the driving clutch elements 22. Each of the screw shafts is shown as carrying similar spring-urged friction clutch elements 43 at its opposite end projecting beyond the frame member 17 to be engaged, in this shifted position by manually operable friction clutch elements 44 so that the screw shafts may be turned in the reverse direction to return the fingers or pointers to their zero positions. In this example, each driving clutch element 44 is mounted on a shaft 45 carrying a bevel gear 46 and all of the bevel gears 46 are driven by a shaft 47 carrying driving gears 48 and the shaft is adapted to be operated by a suitable crank 49 accessible from the outside of the machine. The friction clutch elements permit slippage in those instances where the indicator has been returned to zero prior to the time that all of the others have reached zero. In this instance, the crank end and its operating shaft is adapted to be removably connected to the shaft 47 to permit the casing to be dismantled from the base of the machine and afford access to the operating parts.

In some instances, it is also desirable to operate the counter 35 manually and move it to its zero position for the next tabulating operation. This may be done by any suitable means, but there is shown an operating spindle 50 having a knurled knob 51 accessible at one side of the casing and adapted to be removably connected to the countershaft, likewise to permit the machine casing to be removed.

In some cases, it is highly desirable to operate the machine from a distance, especially in checking up machine operations, size or lengths of parts in plant operations, etc., so that the operator may be located in the shop or plant and the indicating mechanism or machines placed in the offices of an executive. For that purpose, the machine is designed to be operated electrically. Herein, there is shown a series of solenoids 52, one for each screw shaft, arranged on the base 11 of the casing and having armatures 53 mechanically connected to the lower ends of the guide rods 29 so that, when the solenoids are energized, a downward impulse will be imparted to each lever 24 in the same manner as if they had been manually actuated by the push buttons 16. The solenoids are connected by a suitable electric cable 54 to a portable push button block or panel 55 carrying the same number of push buttons 53 as are embodied in the machine. These push buttons, of course, actuate switches to close the circuits to the respective solenoids. It will, of course, be understood that the electric circuits are connected to a suitable source of current, not shown.

Referring again to the graph sheet on which the indicating data is adapted to be printed or reproduced by the method hereinbefore described, it will be understood that a normal or distribution curve may be previously printed on each sheet so that the expected curve produced by the investigation of a group of statistics or observed data will be superimposed thereon and will coincide with it if there is no abnormal tendency or trend in the data. Preferably, however, the sheets are originally blank and comparisons are made between curves produced by successive samplings of data. In Fig. 2, the printed indicia produced by the heads 15 are shown as extending to the right of the normal curve printed on the sheet. If the recorded data represents sizes, for example, the abscissa will show over-sizes, when they appear to the right of the ordinate which passes through the peak of the normal curve. In this particular instance, one can immediately conclude that the trend is toward over-size, and this may be interpreted in terms of accuracy of a machine or an individual mechanic, for example. Remedial measures may be taken and the results determined by investigation of another group of the parts before a machine has so far worn or its adjustment so far disturbed as to produce an excessive number of worthless parts.

The ready detection of this trend, long before the consequences thereof are apparent, will be clearly understood from a more detailed study of the graphs of Fig. 2. In a manufacturing operation, for example, any product falling within the first two, and perhaps even the first three, squares to either side of the line passing through the apex of the broken line curve would come within the permissible limits of dimensions of the product. If size is the characteristic being observed, the number of over-size products is represented by the area beneath the flattened portion of the curve beyond the third square to the right of the line through the apex of the broken line curve. The number of over-size products thus is extremely small, and it is even conceivable that any sample lot from a plurality of manufactured products may not even contain these over-sized products. Thus, to detect a changing condition or trend in the size of the products by checking merely for over-size products would not only prove difficult, but might in certain instances even give an erroneous indication. If, on the contrary, the method herein disclosed is followed and some abscissa value near the line through the apex of the broken line curve be selected, and the ordinate values of the graphs then compared, a pronounced indication of even the slightest trend will be had. By way of example, there might be chosen for this common abscissa point the outside margin of the second square to the right of the line through the apex of the broken line curve. This line in Fig. 2 is seen to intersect the broken line curve one and one-half squares up from the bottom of the chart. This same line intersects the curve indicated by the circles almost six squares up from the bottom of the chart, a change of four and one-half squares in the ordinate value of the curve at that particular abscissa point. Thus, the change is so pronounced as to be readily noted and as to give a clear warning of the trend in the manufacturing process.

From the foregoing description, it will be seen that the improved machine is portable, compact, relatively simple, and easy to operate. The data on any specified group of articles can be tabulated by an ordinary clerk and the results permanently recorded, if desired, for future reference. The judicial use of such data will greatly promote the efficiency of manufacturing processes and business operations.

Obviously, the present invention is not restricted to the particular embodiment thereof herein shown and described. Moreover, it is not essential that all of the features of the invention be used conjointly, since they may be employed ad-

What is claimed is:

1. Indicating apparatus comprising, in combination, a tabulating machine having a chart face presenting a plurality of parallel slots; indicating fingers having heads projecting through said slots and exposed on the chart face; screw threaded shafts connected to operate said indicating fingers to move them in said slots; a push button and ratchet member connected to each of said screw threaded shafts to actuate the same; clutch members for disconnecting the push buttons from the shafts; and means to rotate all of the shafts when disconnected from said push buttons.

2. Indicating apparatus of the character described comprising, in combination, a casing having an upper chart face presenting longitudinal slots therein; indicating members having heads projecting through the slots and exposed on the chart face; screw threaded shafts connected to operate the indicating members; manually operable actuating levers connected to impart step by step rotation to said screw threaded shafts; a plurality of stop members for each actuating lever selectively interposable in the path of said lever to vary the permissible actuating stroke thereof, and means rigidly interconnecting all of said stop members for simultaneous actuation and like positioning.

3. A graphing device comprising, in combination, a casing having in one wall thereof means outlining a chart face one marginal edge of which is subdivided into a plurality of equal divisions adapted to represent ranges in the measure of a characteristic, this edge representing the abscissa axis of a coordinate axis graph the ordinate axis of which is represented by a marginal edge of the chart face at right angles to the first mentioned edge, said wall having formed therein a plurality of slots each parallel with the last named marginal edge and each located at the midpoint of one of said divisions, indicating members housed in said casing projecting one through each of the slots and having a head exposed on the chart face, a screw member for actuating each of the indicating members, a manually operable actuator for each of the screw members, a clutch associated with each screw member and actuator to connect the screw member to the actuator for movement of the indicator by the actuator and to disconnect the screw member for movement of the indicator independently of the actuator, and a single means operatively associated with said screw members for simultaneously moving all of the indicators when the actuators have been disconnected from the screw members.

4. A graphing device comprising, in combination, a casing having in one wall thereof means outlining a chart face one marginal edge of which is subdivided into a plurality of equal divisions adapted to represent ranges in the measure of a characteristic, this edge representing the abscissa axis of a coordinate axis graph, a marginal edge of the chart face at right angles to the first mentioned edge representing the ordinate axis of a coordinate axis graph, said wall having formed therein a plurality of slots each parallel with the last named marginal edge and each located at the midpoint of one of said divisions, indicating members housed in said casing and projecting one through each of the slots, the exposed tip of each indicating member being centered in the slot, independent means associated with each of said indicating members for advancing the indicating member step-by-step along the slot through which it projects, actuating means for each independent means operatively associated therewith to advance an associated indicating member an amount equal to the advance imparted to any other indicating member by similar actuation of any of the other actuating means, and a means common to all of said indicating members operable to impart continuous movement to all of said indicating members simultaneously.

5. A graphing device comprising, in combination, a casing having in the top wall thereof a plurality of parallel equally spaced slots, indicating members housed in said casing and projecting one through each of the slots, means for each of said indicating members for advancing the same longitudinally of the slot including supporting and advancing means, actuating means and a clutch for connecting or disconnecting said supporting and advancing means from said actuating means, and a means common to all of said supporting and advancing means including friction clutches engaged when said first mentioned clutches are disengaged for operating all the indicators simultaneously.

6. A graphing device comprising, in combination, a casing having in one wall thereof a plurality of parallel equally spaced slots adapted to represent midpoints in ranges in a measure of a characteristic, means for indicating the relative number of units of data falling into each range including a plurality of indicating members housed in said casing and projecting one through each of the slots, the exposed tip of each indicating member being centered in the slot, a screw member for each of said indicating members providing a support therefor and connected thereto to advance the same upon rotation of the screw member, a clutch element nonrotatably secured to each end of each screw member, the clutch elements at one end of all of the screw members being frictional clutch elements, individual actuating means for each of said screw members including a clutch element, a common actuating means disposed at the end of said casing opposite said individual actuating means and having a plurality of frictional clutch elements adapted to be simultaneously driven and disposed in axial alignment with and adjacent to the frictional clutch elements carried on said screw members, and a frame supporting all of said screw members, said frame being shiftable in the direction of the screw members, shift of the frame in the one direction connecting the screw members through one set of clutch elements to said individual actuating means for step-by-step advance of the indicating members as the corresponding actuating means are actuated, and shift in the opposite direction disconnecting the screw members from said individual actuating means and connecting the same to said common actuating means through the frictional clutch elements for simultaneous movement of said indicating members.

7. A graphing device comprising, in combination, a casing having in one wall thereof a plurality of parallel, equally spaced slots adapted to represent midpoints in ranges in a measure of a characteristic, means for indicating the relative number of units of data falling into each range including a plurality of indicating members housed in said casing and projecting one through each of the slots, the exposed tip of each indicating member being centered in the slot, independent means associated with each of said indicating members for advancing the indicating member step-by-step along the slot through which it projects, and actuating means for each independent means operatively associated therewith to advance an associated indicating member with each actuation of said actuating means.

8. A graphing device comprising, in combination a casing having in one wall thereof more than two parallel, equally spaced slots adapted to represent midpoints in ranges in a measure of a characteristic, means for indicating the relative number of units of data falling into each range including a plurality of indicating members housed in said casing and projecting one through each of the slots, the exposed tip of each indicating member being centered in the slot, a screw member for each of said indicating members providing a support therefor and connected thereto to advance the same upon rotation of the screw member, actuating means for each of said screw members, and a clutch for each of said screw members for engaging or disengaging the same from the actuating means.

9. A graphing device comprising, in combination, a casing having in one wall thereof a plurality of parallel, equally spaced slots adapted to represent midpoints in ranges in a measure of a characteristic, means for indicating the relative number of units of data falling into each range including a plurality of indicating members housed in said casing and projecting one through each of the slots, the exposed tip of each indicating member being centered in the slot, a screw member for each of said indicating members providing a support therefor and connected thereto to advance the same upon rotation of the screw member, a clutch element nonrotatably secured on one end of each screw member, actuating means for each of said screw members including a cooperating clutch element, and a frame carrying all of said screw members, said frame being shiftable in the direction of the screw members simultaneously to effect engagement or disengagement of all of said clutch elements.

10. A graphing device comprising, in combination, a casing having in one wall thereof means outlining a chart face one marginal edge of which is subdivided into a plurality of equal divisions adapted to represent ranges in the measure of a characteristic, this edge representing the abscissa axis of a coordinate axis graph, a marginal edge of the chart face at right angles to the first mentioned edge representing the ordinate axis of a coordinate axis graph, said wall having formed therein a plurality of slots each parallel with the last named marginal edge and each located at the midpoint of one of said divisions, indicating members housed in said casing and projecting one through each of the slots, the exposed tip of each indicating member being centered in the slot, independent means associated with each of said indicating members for advancing the indicating member step-by-step along the slot through which it projects, and actuating means for each independent means operatively associated therewith to advance an associated indicating member an amount equal to the advance imparted to any other indicating member by similar actuation of any of the other actuating means.

11. In a graphing device having a casing with a plurality of parallel, equally spaced slots in one wall thereof, indicating members housed in said casing and projecting one through each of the slots and means associated with each indicating member for moving the same step-by-step along the slot including actuating means having an operative forward stroke and an idle return stroke, a plurality of stop means for each actuating means selectively interposable in the path of said actuating means variably to limit the permissible operative stroke thereof and thus to vary the advance of the associated indicating member with each actuation of the actuating means, and means rigidly interconnecting all of said stop members for simultaneous and like interposition in the path of said actuating means.

12. A graphing device comprising, in combination, a casing having in the top wall thereof a plurality of parallel, equally spaced slots, indicating members housed in said casing and projecting one through each of the slots, a screw threaded shaft for each of said members operatively associated therewith to move the same longitudinally of the slot upon rotation of the shaft, means for individual and step-by-step actuation of said members including a push button and ratchet member for each of said screw shafts, a clutch for each screw shaft operable to connect or disconnect the shaft from its push button and ratchet member, means for actuating all of said clutches simultaneously, and means for rotating all of said screw threaded shafts simultaneously.

13. A graphing device comprising, in combination, a casing having in the top wall thereof a plurality of parallel, equally spaced slots, indicating members housed in said casing and projecting one through each of the slots, a screw threaded shaft for each of said members operatively associated therewith to move the same longitudinally of the slot upon rotation of the shaft, means for individual and step-by-step actuation of said members including a push button and ratchet member for each of said screw shafts, a clutch for each screw shaft operable to connect or disconnect the shaft from its push button and ratchet member, means for rotating all of said screw threaded shafts simultaneously and in either direction including a common driving member and a clutch for each shaft for connecting the same to or disconnecting the same from said common driving member, and common means for actuating the two groups of clutches connecting the one while disconnecting the other.

HERBERT ZIEBOLZ.